(12) United States Patent
Chou

(10) Patent No.: US 11,353,718 B2
(45) Date of Patent: Jun. 7, 2022

(54) EYEGLASSES STRUCTURE

(71) Applicant: HSIEN CHANG OPTICAL INDUSTRIAL CO., LTD., Tainan (TW)

(72) Inventor: Wen-Hsiung Chou, Tainan (TW)

(73) Assignee: HSIEN CHANG OPTICAL INDUSTRIAL CO., Ltd., Tainan (TW)

( * ) Notice: Subject to any disclaimer, the term of this patent is extended or adjusted under 35 U.S.C. 154(b) by 364 days.

(21) Appl. No.: 16/784,668

(22) Filed: Feb. 7, 2020

(65) Prior Publication Data

US 2021/0247623 A1 Aug. 12, 2021

(51) Int. Cl.
*G02C 1/04* (2006.01)

(52) U.S. Cl.
CPC .................... *G02C 1/04* (2013.01)

(58) Field of Classification Search
CPC ......... G02C 1/04; G02C 2200/08; G02C 5/02
USPC .................................................. 351/41, 62
See application file for complete search history.

(56) References Cited

U.S. PATENT DOCUMENTS

| 7,036,927 B2* | 5/2006 | Kopfer | G02C 11/08 351/62 |
| 9,658,474 B2* | 5/2017 | Sheldon | B29C 39/123 |
| 10,067,360 B2* | 9/2018 | Tipp | G02C 11/08 |

* cited by examiner

*Primary Examiner* — Tuyen Tra
(74) *Attorney, Agent, or Firm* — Rosenberg, Klein & Lee

(57) ABSTRACT

The present invention discloses an eyeglasses structure which comprises a frame and a lens assembly. The frame comprises a groove for engaging with the lens assembly, an inner groove wall having plural first recesses and an outer groove wall having plural second recesses staggered with the plural first recesses. The lens assembly comprises a concave portion corresponding to the plural first recesses and the plural second recesses and engaged with the groove to form at least one ventilation area and plural guiding chutes corresponding to the plural second recesses and communicated with the at least one ventilation area and the plural first recesses.

2 Claims, 5 Drawing Sheets

EYEGLASSES STRUCTURE

BACKGROUND OF THE INVENTION

1. Field of the Invention

The present invention relates to an eyeglasses structure which avoids dusts flying into eyes of a user and has effects of breathability and anti-fog.

2. Description of Related Art

Many eyeglasses structures available on the market do not have anti-fog function. When the environmental temperature is altered dramatically, mist accumulation on the lenses of the eyeglasses structure and hinders the sight of a user wearing the eyeglasses structure. If the user is engaged in an activity such as driving or sporting, low visibility will put users in a dangerous situation. Therefore, it is important to avoid mist generation on the lenses of the eyeglasses structure.

Current methods for preventing mist generation on the lenses of the eyeglasses structure comprises pre-treating the lenses with an anti-fog treatment or spraying a waterproof spray on the lenses. However, the effective time of the waterproof spray is short, so it needs to spray the waterproof spray on the lenses frequently to maintain the anti-fog effect which is inconvenient. Moreover, the main intergradient of the waterproof spray comprises surfactant and other chemical reagents which may damage the lenses and the frame of the eyeglasses structure.

An anti-fog lens assembly is also developed which comprises two sets of lenses spaced apart from each other to reduce thermal transmission between the two sets of lenses. Therefore, the set of lenses located at the inside closes to the user does not fog due to the temperature difference between the human body and environment. However, the anti-fog lens assembly having at least two sets of lens assembly is heavier than the traditional eyeglasses structure and causes burden to the user.

Another kind of anti-fog eyeglasses structure is also developed. A defogging glasses is disclosed by the Taiwan Pat. No. I626489(B) issued on 11 Jun. 2018 which comprises a main body, a gas pump engaged in the main body, a switching element, a control module and a gas channel in the main body. The main body has a frame, at least one leg connected to the frame and at least one lens. The frame comprises at least one accommodation region for accommodating the at least one lens. The accommodation region also has plural gas holes disposed at a peripheral of the at least one accommodation region. The gas pump is a piezoelectric actuation, and the switching element and the control module are electrically connected to the gas pump. The plural gas holes are communicated to the gas pump by the gas channel. After the switching element is turned on, a signal is transmitted to the control module from the switching element to actuate the gas pump. The gas pumping out from the gas pump passes through the gas channel and sprayed out from the plural gas holes for defogging the at least one lens.

However, the defogging glasses having the gas pump for pumping air and the gas holes for spraying gas described above have a great weight and high production cost. Besides, if the gas pump of the defogging glasses is damaged, it is not easy to repair.

SUMMARY OF THE INVENTION

The present invention discloses an eyeglasses structure having at least one guiding chute to communicate with at least one ventilation area and plural first recesses to form a sloped air entry design so as to achieve effects of avoiding dusts flying into eyes of a user and keeping breathability and anti-fog.

The eyeglasses structure of the present invention comprises a frame and a lens assembly. The frame has a groove for engaging with the lens assembly. The frame also comprises an inner groove wall and an outer groove wall. The inner groove wall has plural first blocking walls and plural first recesses, and the outer groove wall has plural second blocking walls and plural second recesses. The plural first recesses and the plural second recesses are arranged in a staggered manner. The lens assembly comprises a concave portion corresponding to the plural first blocking walls, the plural first recesses, the plural second blocking walls and the plural second recesses. The concave portion is engaged with the groove to form at least one ventilation area and further has plural guiding chutes corresponding to the plural second recesses. Accordingly, a sloped air entry is formed by the plural guiding chutes communicating with the at least one ventilation area and the plural first recesses so as to achieve effects of avoiding dusts flying into eyes of a user and keeping breathability of the eyeglasses structure. Therefore, the present invention avoids mist accumulation on the lens assembly thereof due to temperature difference and improves overall practicality.

Preferably, the frame comprises two protruding portions respectively disposed at two outer laterals thereof, and the lens assembly has two engaging portions for correspondingly engaging with the two protruding portions. The engagement of the engaging portions and the protruding portions maintains the at least one ventilation area unblocked.

DETAILED DESCRIPTION OF THE PREFERRED EMBODIMENT

To provide a thorough understanding, the purpose and advantages of the present invention will be described in detail with reference to the accompanying drawings.

Figure 1:
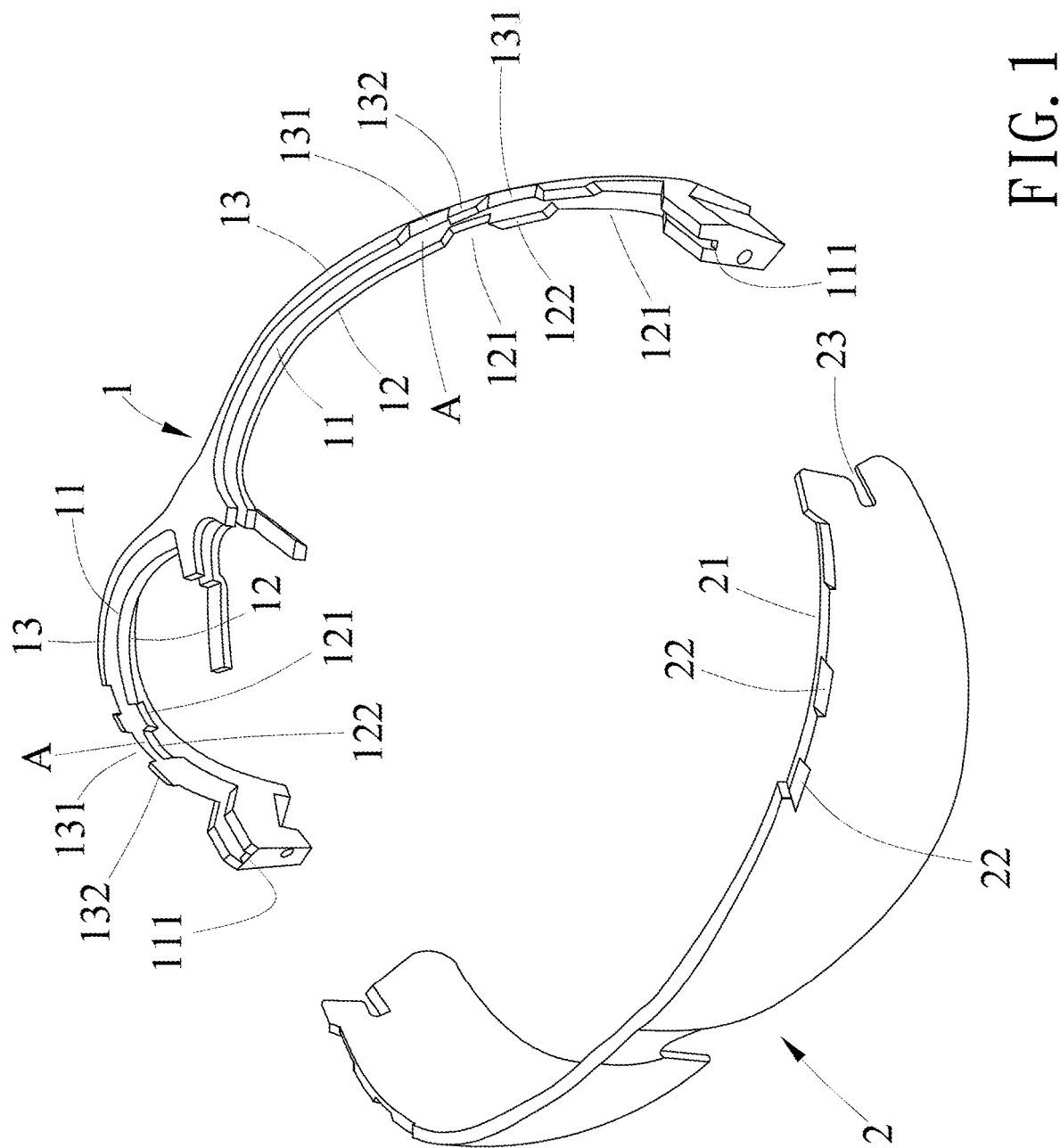
FIG. 1 is an exploded diagram showing a first embodiment for an eyeglasses structure of the present invention.
Figure 2:
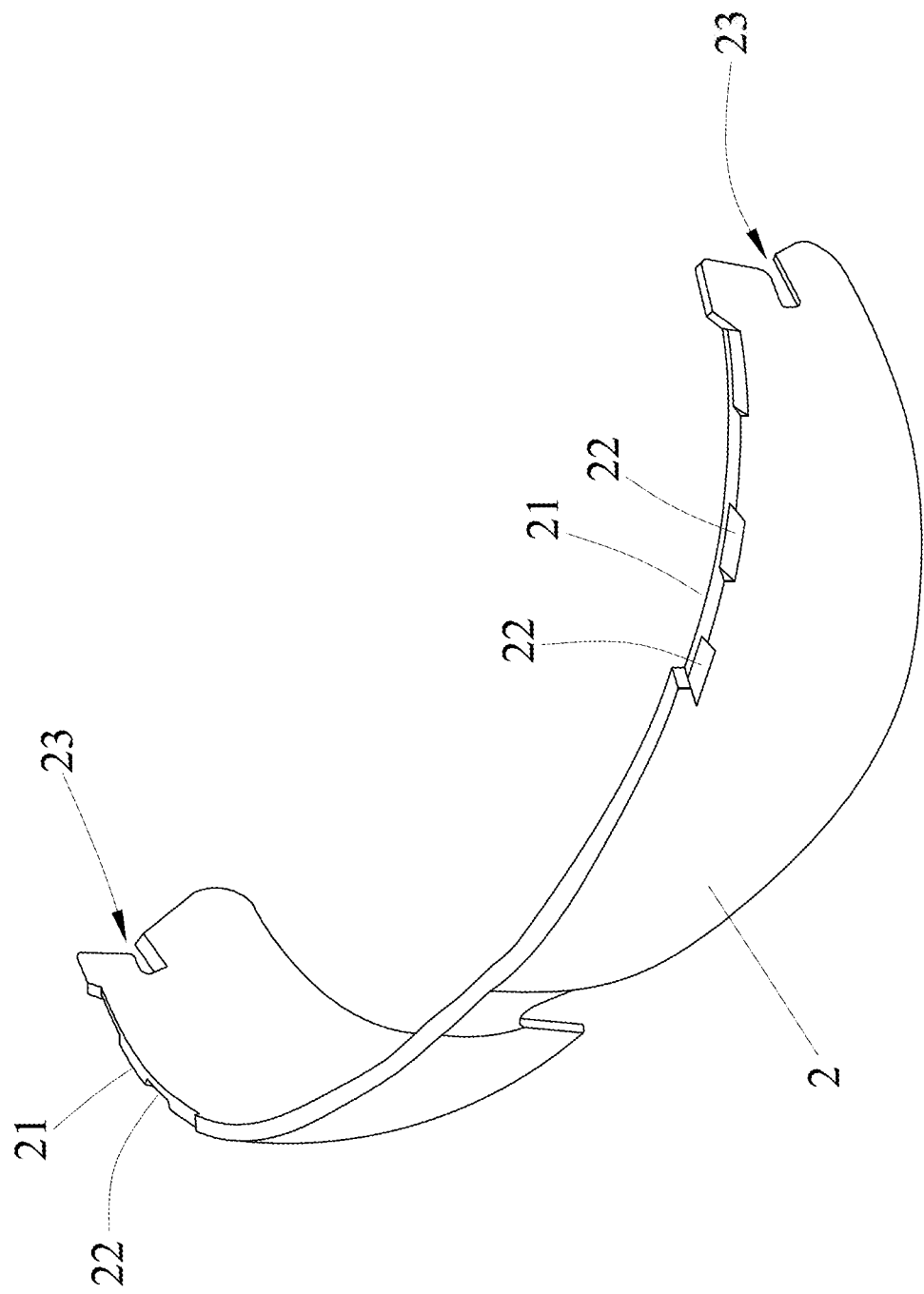
FIG. 2 is a stereogram showing a lens assembly of the present invention.
Figure 3:
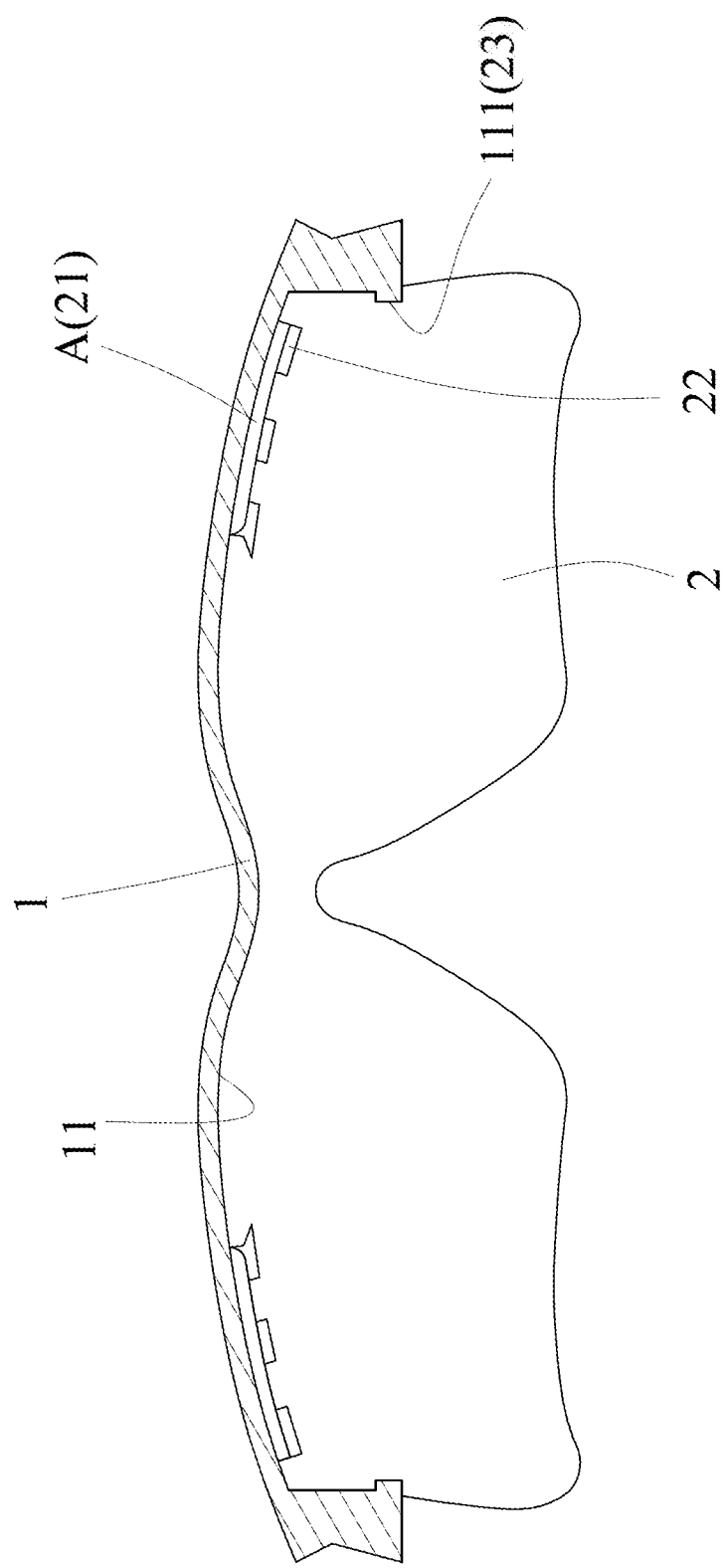
FIG. 3 is a longitudinal sectional diagram showing an eyeglasses structure of the present invention in assembly.

Referring to FIG. 1 and FIG. 2, the present invention comprises a frame (1) having a groove (11) and a lens assembly (2) engaged with the groove (11) of the frame (1).

The frame (1) also comprises an inner groove wall (12) and an outer groove wall (13). The inner groove wall (12) has plural first recesses (121) and plural first blocking walls (122), and each of the plural first blocking walls (122) is formed between the two adjacent first recesses (121). The outer groove wall (13) has plural second recesses (131) corresponding to the plural first blocking walls (122) and staggered with the plural first recesses (121). The outer groove wall (13) also comprises plural second blocking walls (132) and each of which is formed between the two adjacent second recesses (131).

The lens assembly (2) comprises a concave portion (21) corresponding to the plural first recesses (121), the plural first blocking walls (122), the plural second recesses (131) and the plural second blocking walls (132). The lens assembly (2) is engaged with the groove (11) of the frame (1) to form at least one ventilation area (A). The concave portion (21) of the lens assembly (2) has plural guiding chutes (22) thereon corresponding to the plural second recesses (131) of the outer groove wall (13), and the plural guiding chutes (22) are communicated with the at least one ventilation (A) area and the plural first recesses (121) of the inner groove wall (12).

Figure 4:
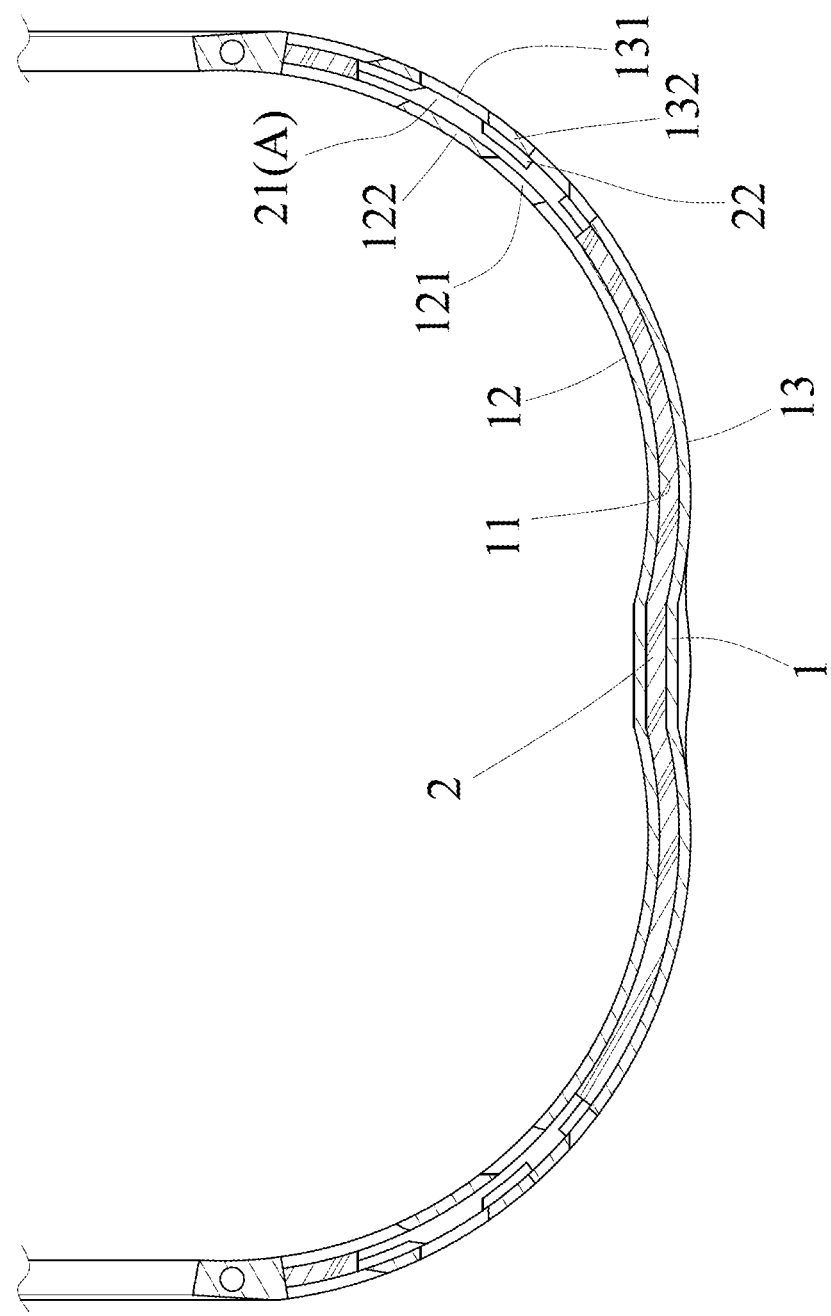
FIG. 4 is a cross sectional diagram showing an eyeglasses structure of the present invention in assembly.

To assemble the present invention, the concave portion (21) of the lens assembly (2) is faced to the plural first recesses (121), the plural first blocking walls (122), the plural second recesses (131) and the plural second blocking walls (132), and then the lens assembly (2) is engaged with the groove (11) of the frame (1) as shown in FIG. 1 to FIG. 4. Referring to FIG. 1 and FIG. 4, two protruding portions (111) are respectively disposed at two outer laterals of the groove (11) of the frame (1), and the lens assembly (2) are provided with two engaging portions (23) for correspondingly engaged with the two protruding portions (111) of the frame (1) for positioning and maintaining the at least one ventilation area (A). Therefore, the at least one ventilation area (A) is not over-compressed and maintain unobstructed when the lens assembly (2) is engaged with the frame (1).

The unobstructed at least one ventilation area (A) is formed after the lens assembly (2) is engaged with the frame (1), and the at least one ventilation area (A) is communicated with the plural first recesses (121) and the plural second recesses (131) of the frame (1) which are staggered with each other. When a user wears the present invention, the dusts blown to the face thereof from the plural second recesses (131) will be blocked by the plural first blocking walls (122) which are corresponding to the plural second recesses (131). Therefore, the present invention avoids dust flying into the eyes of a user from the plural second recesses (131). Natural gas can flow into the at least one ventilation area (A) through the guiding chute (22) which communicates the at least one ventilation area (A) with the first recess (121) of the inner groove wall (12) to form a sloped air convection. Air blown out by the user is also exhausted from the plural first recesses (121) to the ventilation area (A), the plural guiding chutes (22) and the plural second recesses (131) of the present invention so as to avoid mist accumulation on the lens assembly (2) which hinders the sight of the user.

Figure 5:
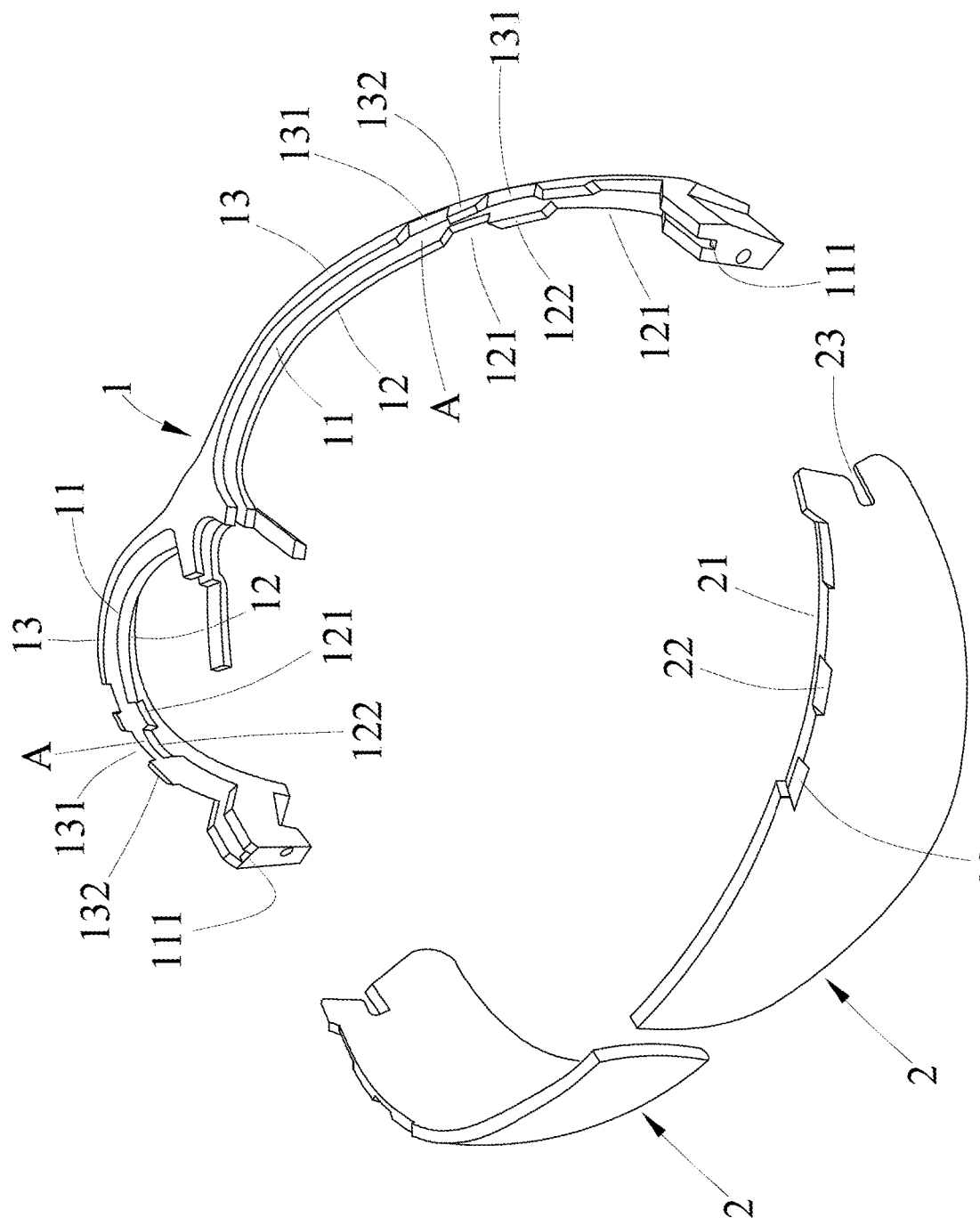
FIG. 5 is an exploded diagram showing a second embodiment for an eyeglasses structure of the present invention.

In addition, the lens assembly (2) of the present invention comprises a unitary one-piece construction or a two-piece construction as shown in FIG. 5.

Accordingly, the present invention has advantages below compared to the prior technical feathers.

1. The eyeglasses structure of the present invention has a sloped air entry design formed by the plural guide chutes communicating with the at least one ventilation area and the plural first recesses so as to achieve effects of avoiding dusts flying into eyes of a user for protection.

2. The sloped air entry design of the present invention achieves an air circulation effect so as to keep breathability thereof and avoid mist generation on the lens assembly due to temperature difference.

3. The lens assembly of the present invention is engaged with the two protruding portions of the frame by the two engaging portions for positioning and maintaining the at least one ventilation area unobstructed.

What is claimed is:

1. An eyeglasses structure, comprising:
a frame having a groove, an inner groove wall having plural first recesses and plural first blocking walls, an outer groove wall having plural second blocking walls and plural second recesses corresponding to the plural first blocking walls and staggered with the plural first recesses, and two protruding portions respectively disposed at two outer laterals thereof, wherein each of the plural first blocking walls is formed between the two adjacent first recesses, and wherein each of the plural second blocking walls is formed between the two adjacent second recesses; and
a lens assembly having a concave portion corresponding to the plural first blocking walls, the plural first recesses, the plural second blocking walls and the plural second recesses and engaged with the groove of the frame to form at least one ventilation area, two engaging portions for correspondingly engaged with the two protruding portions of the frame for positioning and maintaining the at least one ventilation area, and plural guiding chutes disposed on the concave portion and corresponding to the plural second recesses and communicated with the at least one ventilation area and the plural first recesses.

2. The eyeglasses structure as claimed in claim 1, wherein the lens assembly comprises a unitary one-piece construction or a two-piece construction.

* * * * *